United States Patent
Otsuki et al.

[15] 3,666,794
[45] May 30, 1972

[54] STABILIZATION OF ACRYLIC ACID OR ESTERS THEREOF

[72] Inventors: Susumu Otsuki; Isao Miyanohara, both of Tsuno-gun, Yamaguchi-ken, Japan

[73] Assignee: Toyo Soda Manufacturing Co., Ltd., Yamagushi-ken, Japan

[22] Filed: May 8, 1969

[21] Appl. No.: 823,181

[30] Foreign Application Priority Data

Jan. 22, 1969 Japan........................................44/4645

[52] U.S. Cl..........................................260/486 R, 260/526 R
[51] Int. Cl..................................................C07c 69/54
[58] Field of Search..........................................260/486, 526

[56] References Cited

UNITED STATES PATENTS 2,618,652  11/1952  Hollyday..............................260/486
2,916,512  12/1959  Fisher et al. ........................260/486

Primary Examiner—Lewis Gotts
Assistant Examiner—Paul J. Killos
Attorney—Flynn & Frishauf

[57] ABSTRACT

A process for inhibiting polymerization of acrylic acid or esters thereof and a process for stabilizing a distillation operation of acrylic acid or esters thereof through the joint use of multiple polymerization inhibitors, i.e., hydroquinone, phenol and air (or oxygen) in specified amounts.

4 Claims, No Drawings

STABILIZATION OF ACRYLIC ACID OR ESTERS THEREOF

BACKGROUND OF THE INVENTION

1. Field of the Invention

The present invention relates to a process for inhibiting polymerization of acrylic acid or its esters which comprises using a polymerization inhibitor composition. This invention is particularly useful for preventing the polymerization of acrylic acid or its esters in the course of distillation operation. Accordingly, this invention also relates to a process for stabilizing a distillation operation of acrylic acid or esters thereof.

2. Description of the Prior Art

Distillation operations are widely employed in processes for preparing acrylic acid or esters thereof, and are particularly employed for concentration and purification of acrylic acid or esters thereof. It is widely known that acrylic monomer is easily polymerized by heating. And further, it is well known that gaseous phase and liquid phase are simultaneously present in the distillation step and that so-called popcorn polymerization often occurs, particularly in the gaseous phase. This polymer grows quickly and is almost entirely insoluble in all solvents.

In the other words, unless an effective polymerization inhibitor is employed in both gaseous and liquid phases, blockage of a column may occur and continuous operation becomes impossible.

DESCRIPTION OF THE INVENTION

The inventors have carried out research on numerous materials and discovered that joint use of three components, i.e., hydroquinone, phenol, and air (or oxygen), is remarkably effective for inhibiting the polymerization of acrylic monomer in a distillation column.

The above-mentioned materials are known individually as polymerization inhibitors and the characteristic feature of this invention comprises the simultaneous use of said three components and thereby gaining a synergistic effect, i.e., an effect far beyond the inhibitory effect obtained in the case of using one component alone or two components in combination.

When distilling acrylic monomer, polymer is formed at points of vapor stagnation in the column, on the reverse side of plates, inside the column wall, and on the external surface of the overflow pipes. The polymer forms quickly, even in the presence of one or two conventional polymerization inhibitors.

Contrary to this, if hydroquinone and phenol are fed into a distillation column from the top in an amount, so as to give a concentration of 50 PPM or more, and 200 PPM or more respectively, preferably 200 PPM or more, and 1,000 PPM or more respectively in the liquid of the column and simultaneously, air (or oxygen) is fed into the column from the bottom in an amount sufficient to give a concentration of one percent (oxygen: 0.2 percent) or more in proportion to vapor, preferably in an amount of 3 percent (oxygen: 1 percent) in proportion to vapor, growth of polymer can be almost completely inhibited.

The following examples are given to illustrate further the method of the present invention, and to indicate clearly the benefits to be afforded through the utilization thereof.

EXAMPLE 1

A purified acrylic acid was charged in a glass distillation column of 20 mm inside diameter and a Raschig ring was packed to 200 mm height and acrylic acid was totally refluxed under an operating pressure of 70 mm Hg, at a bottom temperature of 77° C and a top temperature of 72° C. A polymerization inhibitor was added into the column from the top in the form of acrylic acid solution and air was introduced into the column from the bottom thereof.

In all cases, polymer was produced around a thermometer well provided at the top of the column (A) and at the packed section (B).

The effects of the inhibitors are set forth in Table I.

TABLE I

| | Polymerization Inhibitor | Concentration of the Inhibitor | Time before Polymer deposition (hr) | |
|---|---|---|---|---|
| | | | (A) | (B) |
| Conventional process 1 | Hydroquinone | Concentration in 0.03% liquid phase | 3 | 8 |
| | Nitrogen | Concentration in 1% vapor phase | | |
| 2 | Hydroquinone | 0.4% | 17 | 25 |
| | Air | 1% | | |
| Process of the present Invention 3 | Hydroquinone | 0.02% | 50 or more | |
| | Phenol | 0.1% | | |
| | Air | 1% | | |

EXAMPLE II

A purified acrylic acid was charged in a column of 50 mm inside diameter equipped with five perforated plates, and acrylic acid was totally refluxed under an operating pressure of 80 mm Hg, at a bottom temperature of 83° C and top temperature of 76° C. A polymerization inhibitor was added into the top of said column in the form of acrylic acid solution and air was introduced into the column from the bottom thereof.

The effects of the polymerization inhibitors are set forth in Table II.

The amounts of both hydroquinone and phenol herein are respectively expressed as a concentration in liquid phase in the column and the gas concentration is expressed as a concentration in vapor phase in the column.

TABLE II

| | Kinds of polymerization inhibitor | Concentration (percent) | Time before polymer deposition (hrs.) |
|---|---|---|---|
| Conventional Processes: | | | |
| 1 | Hydroquinone / Nitrogen | 0.03 / 0.4 | 2. |
| 2 | Hydroquinone / Air | 0.03 / 0.4 | 3. |
| 3 | Hydroquinone / Air | 0.03 / 10 | 12. |
| 4 | Hydroquinone / Oxygen | 0.02 / 5 | 18. |
| 5 | Phenol / Air | 0.3 / 0.4 | 7. |
| Outside of this process: | | | |
| 6 | Hydroquinone / Phenol / Air | 0.02 / 0.3 / 0.4 | 8. |
| Processes of the present invention: | | | |
| 7 | Hydroquinone / Phenol / Air | 0.02 / 0.2 / 1.0 | 24. |
| 8 | Hydroquinone / Phenol / Air | 0.02 / 0.1 / 2.0 | 50. |
| 9 | Hydroquinone / Phenol / Air | 0.02 / 0.1 / 3.0 | 50 or more. |
| 10 | Hydroquinone / Phenol / Air | 0.02 / 0.1 / 5.0 | |

The polymerization inhibitors in No. 1 to No. 5 consist of one component alone or two components. Inhibitor No. 6 consists of three components; however, the concentration of air is lower than the range specified in this invention and the time before the polymer deposition is short. Inhibitors No. 7 to No. 10 are polymerization inhibitor compositions in accordance with the present invention and, in contrast with the others, the time before polymer deposition is long.

EXAMPLE III

A liquid composition consisting of 95 percent ethyl acrylate, 2 percent ethanol and 3 percent water was fed in the middle stage of a column of 15 perforated plates and of 50 mm inside diameter. Distillation was effected by taking ethyl acrylate out from the bottom of the column by means of azeotropic distillation. A solution of hydroquinone-ethanol was fed into the column from the top and the concentration of hydroquinone in the liquid phase of the column was maintained at 0.05 percent and the temperature in the column top was kept at 77° C and thereby continuous distillation was performed. Polymerization occurred inside of the column in the course of 5 days.

Then, the same experiment was performed by feeding a polymerization inhibitor of this invention from the top, thereby keeping the concentration of hydroquinone at 0.02 percent and of phenol at 0.1 percent in the liquid phase. And air was supplied from the bottom in an amount so as to give an air concentration of 3 percent in the vapor phase. After 12 days, deposition of polymer was still not observed.

What we claim is:

1. A process for inhibiting polymerization of acrylic acid or esters thereof through the joint use of hydroquinone, phenol and oxygen containing gas in which the addition amount of hydroquinone is selected so as to give a concentration higher than 50 ppm, the addition amount of phenol is selected so as to give a concentration higher than 200 ppm, and the addition amount of oxygen containing gas is selected so as to give a concentration as calculated in terms of oxygen higher than 0.2 percent.

2. A process of claim 1, wherein said oxygen containing gas is air.

3. A process for stabilizing a distillation operation of acrylic acid or esters thereof through the joint use of hydroquinone, phenol, and oxygen containing gas in which the addition amount of hydroquinone is selected so as to give a concentration higher than 50 ppm, the addition amount of phenol is selected so as to give a concentration higher than 200 ppm, and the addition amount of oxygen containing gas is selected so as to give a concentration is calculated in terms of oxygen higher than 0.2 percent.

4. A process of claim 3, wherein said oxygen containing gas is air.

* * * * *